United States Patent

Mc Kee et al.

[11] Patent Number: 6,103,829
[45] Date of Patent: Aug. 15, 2000

[54] CASTING COMPOUNDS FOR THE PRODUCTION OF MOULDINGS WITH REDUCED SURFACE GLOSS

[75] Inventors: Graham Edmund Mc Kee; Bernhard Rosenau, both of Neustadt; Walter Heckmann, Weinheim, all of Germany

[73] Assignee: BASF Aktiengesellschaft, Ludwigshafen, Germany

[21] Appl. No.: 09/155,902

[22] PCT Filed: Apr. 15, 1997

[86] PCT No.: PCT/EP97/01875

§ 371 Date: Oct. 8, 1998

§ 102(e) Date: Oct. 8, 1998

[87] PCT Pub. No.: WO97/39062

PCT Pub. Date: Oct. 23, 1997

[30] Foreign Application Priority Data

Apr. 15, 1996 [DE] Germany ............................ 196 14 844

[51] Int. Cl.$^7$ .............................. C08L 51/00; C08L 37/00
[52] U.S. Cl. .............................. 525/242; 525/66; 525/71; 525/78; 525/84; 525/243
[58] Field of Search .................. 525/66, 78, 71, 525/84, 242, 243

[56] References Cited

U.S. PATENT DOCUMENTS

| | | | |
|---|---|---|---|
| 3,691,260 | 9/1972 | Mittnacht et al. | 260/876 |
| 4,224,419 | 9/1980 | Swoboda et al. | 525/71 |
| 4,433,102 | 2/1984 | Brandstetter et al. | 525/75 |
| 4,442,263 | 4/1984 | Brandstetter et al. | 525/83 |
| 4,634,734 | 1/1987 | Hambrecht et al. | 525/85 |
| 4,788,253 | 11/1988 | Hambrecht et al. | 525/83 |
| 4,798,869 | 1/1989 | Sturm et al. | 525/305 |
| 4,857,591 | 8/1989 | Eichenauer et al. | 525/74 |
| 4,870,131 | 9/1989 | Pisipati et al. | 525/94 |
| 5,008,330 | 4/1991 | Laughner | 525/67 |
| 5,026,777 | 6/1991 | Galbert et al. | 525/67 |
| 5,223,573 | 6/1993 | Kuruganti et al. | 525/67 |
| 5,270,386 | 12/1993 | Laughner | 525/66 |
| 5,286,790 | 2/1994 | Laughner | 525/67 |
| 5,354,796 | 10/1994 | Creecy et al. | 525/464 |
| 5,395,882 | 3/1995 | Siol et al. | 525/82 |
| 5,539,030 | 7/1996 | Laughner | 525/66 |
| 5,543,448 | 8/1996 | Laughner | 525/66 |
| 5,580,924 | 12/1996 | Wildi et al. | 525/71 |
| 5,821,302 | 10/1998 | Rosenau et al. | 525/80 |

FOREIGN PATENT DOCUMENTS

| | | |
|---|---|---|
| 201099 | 12/1986 | European Pat. Off. . |
| 328960 | 8/1989 | European Pat. Off. . |
| 381358 | 8/1990 | European Pat. Off. . |
| 522791 | 1/1993 | European Pat. Off. . |
| 621291 | 10/1994 | European Pat. Off. . |
| 654454 | 5/1995 | European Pat. Off. . |
| 1182811 | 2/1962 | Germany . |
| 3149046 | 12/1981 | Germany . |
| 3206136 | 2/1982 | Germany . |
| 3227555 | 7/1982 | Germany . |

*Primary Examiner*—P. Hampton-Hightower
*Attorney, Agent, or Firm*—Keil & Weinkauf

[57] ABSTRACT

Molding materials (F) which are suitable for the production of shaped articles having reduced surface gloss and are based on polymers or polymer blends (P), preferably ASA polymers and/or styrene/acrylonitrile copolymers, contain a sufficient amount of a dull graft copolymer (A) admixed as dulling agent, which was prepared by one-stage or multi-stage graft copolymerization of monomers forming the hard shell onto an elastomeric acrylate polymer, the graft copolymerization being carried out to a conversion of more than 15% by thermal or free radical mass or solution polymerization.

9 Claims, No Drawings

CASTING COMPOUNDS FOR THE PRODUCTION OF MOULDINGS WITH REDUCED SURFACE GLOSS

BACKGROUND OF THE INVENTION

1. Field of the Invention

The present invention relates to molding materials based on polymers or polymer blends which contain, in admixed form and in sufficient amount, a dull molding material based on a graft polymer as dulling agent and which can be processed to give shaped articles having low surface gloss.

2. Description of the Related Art

Copolymers of alkenyl aromatics and nitriles and/or esters of acrylic acid or methacrylic acid are widely used for the production of industrial shaped articles. Since the shaped articles are often also intended to be impact-resistant, the stated copolymers are then mixed with rubber-modified copolymers in which monomers forming hard polymers, such as styrene, methylstyrene, acrylonitrile, methyl methacrylate, are grafted onto an elastomer. Polymers having a hard phase and a soft or rubber phase result. When the rubber phase is the grafting base, the elastomers used in particular are polybutadiene, ethylene/propylene copolymers, ethylene/propylene diene copolymers and elastomeric acrylate copolymers. The resulting polymer blends have long been commercially available as ABS, AES or ASA polymers.

For some uses, however, they have the disadvantage that shaped articles produced therefrom possess high surface gloss and reflect incident light.

It is known that the often undesirable surface gloss of the plastics shaped articles can be reduced by providing their surface with embossed structures or a dull coating or adding inorganic fillers, crosslinked polymers or rubber components into the plastics molding materials forming them. The methods are unsatisfactory since some of them are labour-intensive and some lead under the processing conditions to nonuniform surfaces or to shaped articles having insufficient impact strength. DE-A 42 31 995 describes dulling agents comprising methacrylates polymerized in emulsion. They contain no rubber, are brittle and adversely affect the toughness of the end products. The preparation of dull graft copolymers based on polybutadiene has been known for some years from EP-A 0201 099, EP-A 0328 960 and EP-A 0381 358. According to EP-A 0381 358, vinylaromatics are subjected to mass polymerization and then to suspension polymerization with unsaturated nitrites in the presence of from 5 to 15% by weight of a special polybutadiene to a conversion of from 1 to 15% by weight of the amount of monomer. The disadvantage of this process is that a higher concentration of polybutadiene leads to problems, and the process functions only with special polybutadienes having a low cis content but not with other polybutadienes and also not with styrene-containing butadiene rubber (SBR). Furthermore, maintaining the low conversion limits in the mass polymerization is extremely critical for achieving the desired results. The dulling agents obtained according to EP-A 0201 099, 0328 960 and 0381 358 all have the serious disadvantage that they are not weathering-resistant and become discolored and their impact strength declines.

U.S. Pat. No. 4,857,591 discloses the use of a hydrogenated butadiene/acrylonitrile copolymer as a dulling agent for polymers. However, such hydrogenated copolymers often still contain residual C=C double bonds, as a result of which the weathering stability of the copolymers is adversely affected. These dulling agents, too, have a relatively dark color which is evident in the end products.

BRIEF SUMMARY OF THE INVENTION

The present invention provides, as dulling agents for polymers and polymer blends, polymer additives which are themselves weathering-resistant and impact-resistant and remain impact-resistant even after weathering and do not become discolored. In particular, they are suitable for effective dulling of ASA polymers.

The specially prepared dull molding materials modified with acrylate polymers can be used as weathering-resistant dulling agents for polymers and polymer blends.

DETAILED DESCRIPTION OF THE INVENTION

The present invention relates to molding materials (F) suitable for the production of shaped articles having reduced surface gloss, and based on polymers or polymer blends (P), which contain, in admixed form and in sufficient amount, a dull molding material (A) based on a graft copolymer as a dulling agent, wherein the dull molding material (A) was prepared by one-stage or multistage polymerization of a mixture (AM) containing a) one or more olefinically unsaturated monomers (A1m) which form the graft shell (A1) and form a polymer or copolymer having a glass transition temperature of at least +20° C., and b) as the grafting base, a prepared acrylate copolymer (A2) which is dissolved or swollen in the monomer or monomers (A1m) and has a glass transition temperature of less than −20° C., at least the first stage of the polymerization of the mixture (AM) being carried out, to a conversion of more than 15% by weight of the monomers, by thermal or free radical mass or solution polymerization.

The present invention furthermore relates to the use of the abovementioned specially prepared molding material (A) as a dulling agent for molding materials (F) based on polymers or polymer blends (P).

DE-A 11 82 811, published more than 30 years ago, discloses the polymerization of the acrylate with a crosslinking monomer in solution for the preparation of the acrylic rubber, the monomers styrene and acrylonitrile to be grafted on being added, in the examples, after a conversion of only from 20 to 40% by weight of the monomers, and then being polymerized by mass or solution polymerization. However, owing to the varying monomer composition during the grafting reaction and also because of the incorporation of acrylate units into the graft shell by polymerization, this leads to a reduction in the Vicat softening temperature and a deterioration of other mechanical properties of the resulting molding materials. In contrast, the novel graft polymerization of the monomers (A1m) onto the unmodified or modified acrylate polymer (A2) starts from a completely polymerized acrylate polymer so that virtually no more acrylate monomers are present in the polymerization of the graft monomers.

The acrylate polymer (A2) used for the preparation of the novel dull molding material (A) is predominantly prepared from monomers (A2m1) of the formula $CH_2=CR^1-COOR^2$, where $R^1$ is hydrogen or methyl and $R^2$ is alkyl of 1 to 12 carbon atoms. Acrylates of a linear or not more than singly branched alkyl alcohol of 4 to 12 carbon atoms are particularly preferred. Preferred monomers are acrylates of n-butyl alcohol and of 2-ethylhexyl alcohol. For a given content of certain comonomers, the glass transition temperature of the resulting acrylate polymer (A2) can be established by the choice of acrylates, methacrylates or mixtures thereof, and said glass transition temperature should be in particular less than −10° C., preferably less than −20° C. The possibility of establishing the glass transition temperature is based on the fact that the glass transition temperature of acrylate and methacrylate polymers initially decreases with increasing length of the alkyl side chains, passes through a minimum at $C_7$-acrylate or $C_{10}$-methacrylate and then increases again. In general, the acrylate polymer (A2) contains from 50 to 100, preferably at least 70, % by weight of alkyl acrylate or methacrylate.

The acrylate polymer (A2) advantageously contains further monomers as polymerized units. Highly suitable monomers of this type are monomers (A2m2) having at least two olefinically unsaturated double bonds, such as allylmethacrylate or acrylate, 1,4-butanediol dimethacrylate or diacrylate, divinylbenzene, triallyl cyanurate, diallyl maleate, diallyl phthalate and dihydrodicyclopentadienyl acrylate or methacrylate. Among these, monomers having nonconjugated C=C double bonds are preferred, in particular allyl methacrylate and dihydrodicyclopentadienyl acrylate and methacrylate. The acrylate polymer (A2) contains the comonomers (A2m2) in an amount of from 0 to 20, in particular from 0.3 to 12, % by weight, based on the acrylate polymer (A2), as polymerized units.

The incorporation of an olefinically unsaturated comonomer (A2m3) having a chemically reactive group (A2m3x) as polymerized units into the acrylate polymer (A2) in an amount of from 1 to 25, in particular from 3 to 15, % by weight, based on the acrylate polymer (A2), has proven very advantageous. Examples of such chemically reactive groups are epoxy, amino, amido, hydroxyl, carboxylic anhydride and carboxyl groups, preferably epoxy, hydroxyl and carboxylic anhydride groups. Examples of comonomers (A2m3) are olefinically unsaturated glycidyl esters and glycidyl ethers, such as glycidyl methacrylate and acrylate, aminoalkyl (meth)acrylates and aminoalkyl(meth) acrylamides, such as N-2-aminoethylmethacrylamide and aminohydroxypropyl methacrylate, and 2-hydroxyethyl methacrylate and acrylate, acrylamide and methacrylamide, N-hydroxymethyl(meth)acrylamide, ethers and esters thereof, such as N-methoxymethylacrylamide and N-methoxymethylmethacrylamide, maleic anhydride, acrylic acid, methacrylic acid and crotonic acid. The advantage of the incorporation of such chemically reactive monomers (A2m3) by polymerization is stronger bonding between acrylate polymer (A2) as the grafting base and the graft shell (A1) when monomers having chemically reactive groups (A1mf) or polymers having chemically reactive groups (A1Pf) are added to the graft monomers (A1m), as explained in more detail further below in connection with the monomers for the graft shell (A1m).

Improved grafting of monomers onto the acrylate polymer (A2) as the grafting base can also be achieved if the acrylate polymer (A2) contains, as polymerized units, at least one comoner (A2m4) having a group which forms free radicals by thermal decomposition during the graft polymerization and is capable of initiating the polymerization of olefinically unsaturated monomers (A1m) for the formation of the polymer shell. Suitable monomers (A2m4) are in particular monomers having peroxy or azo groups. Examples of such monomers (A2m4) are tert-butyl 3-isopropenyl cumyl peroxide, tert-butyl peroxycrotonate and tert-butyl monoperoxymaleate.

The polymerization or copolymerization of the monomers for the preparation of the acrylate polymer can be carried out in a known manner, preferably by mass, solution or emulsion polymerization, and is initiated in particular with conventional free radical initiators. It is intended to retain the chemically reactive groups of the comonomers (A2m3) and those groups of the comonomers (A2m4) which form free radicals, necessitating the choice of suitable low polymerization temperatures and effective free radical initiators.

After complete preparation and any required removal of residual monomers or isolation of the acrylate polymer (A2), the acrylate polymer (A2) is dissolved or at least thoroughly swollen in the monomers (A1m) subsequently forming the graft shell (A1), with stirring and/or heating and/or addition of required amounts of a suitable inert solvent or solvent mixture. The amount of solvent should in general not exceed 50% by weight of the sum of the amounts of monomers (A1m) and acrylate polymer (A2).

Suitable monomers (A1m) which subsequently form essentially the hard graft shell are monomers and monomer mixtures which form a polymer or copolymer having a glass transition temperature of more than +20° C., preferably more than +50° C. Monomers (A1m) whose polymers or copolymers are completely or partially compatible with the polymers or polymer blends (P) are also preferred. Examples of suitable monomers (A1m) are in particular alkenylaromatics, such as styrene, α-methylstyrene, styrenes which are alkylated on the nucleus and where the alkyl radical is of 1 to 4 carbon atoms or chlorostyrene, nitriles of acrylic or methacrylic acids, in particular acrylonitrile, and lower methacrylates where the alkyl radical is from 1–4 carbon atoms, preferably methyl methacrylate, and mixtures thereof. A mixture of styrene and/or α-methylstyrene with acrylonitrile in which the styrene and/or α-methylstyrene is present in particular in an amount of from 50 to 80% by weight and the acrylonitrile is present in an amount of from 20 to 50% by weight, based on the amount of the mixture, is preferably used as monomers (A1m). Further monomers, e.g. N-phenylmaleimide, may also be present as graft monomers (A1m), in minor amounts, in particular up to 25% by weight of the total amount of monomers (A1m).

The amount of the monomers (A1m) in the mixture (AM) depends in particular on the desired content of acrylic rubber (A2) in the resulting molding material (A). In general, the amount by weight of the monomers (A1m) for achieving an adequate graft shell (A1) is from about 2 to 45, in particular from 5 to 25% by weight, based on the sum of the amounts or acrylic rubber (A2) and monomers (A1m), and larger amounts increase the proportion, always present, of copolymers of the monomers (A1m) (polymer matrix) in the resulting molding material (A).

If use is made of a preferred embodiment of the invention and an acrylate polymer (A2) which contains, as polymerized units, the comonomer (A2m3) having chemically reactive groups (A2m3x), a minor amount, in particular from 1 to 25% by weight, based on the total amount of monomers in the mixture (AM), of a monomer (A1mf) and/or of a polymer (A1Pf) which is completely or partially compatible with the monomers (A1m) is admixed with the monomers (A1M) before, during or after the dissolution of swelling of the acrylate copolymer (A2) in the monomers (A1m) forming the graft shell, each monomer (A1mf) and each polymer (A1Pf) containing a chemically reactive group (A1fx) which is capable of reacting with the chemically reactive groups (A2m3x) of the acrylate copolymer (A2) or which, with the aid of a polyfunctional crosslinking agent (AMV) added to the mixture (AM), permits coupling with the chemically reactive groups (A2m3x) of the acrylate copolymer (A2). A polyfunctional crosslinking agent (AMV) contains at least two chemically reactive groups which react both with the chemically reactive groups (A1m3x) of the acrylate copolymer (A2) and with the chemically reactive groups (A1fx) of the added monomers (A1mf) and/or polymers (A1Pf), in particular during the polymerization reaction. A suitable crosslinking agent (AMV) is, for example, a diamine or polyamine having at least two primary or secondary amino groups, such as alkylenediamines and in particular ethylenediamine, if the reactive groups (A2m3x) in the acrylate copolymer (A2) and the reactive groups in the monomer (A1mf) and/or polymer (A1Pf) are, for example, epoxy or carboxylic anhydride groups.

If no polyfunctional crosslinking agent (AMV) is present and the acrylate copolymer (A2) contains epoxy groups as the chemically reactive groups (A2m3x), it is suitable to add monomers (A1mf) and/or polymers (A1Pf) which contain, for example, amino, hydroxyl, amido, carboxyl or carboxylic anhydride groups, such as β-hydroxyethyl methacrylate or acrylate or (co)polymers thereof, aminoalkylmethacrylamides or aminoalkylacrylamides or copolymers thereof, maleic anhydride or copolymers thereof or acrylic or methacrylic acid or copolymers thereof.

The polymerization of the monomers (A1m) in the presence of the acrylate polymer (A2) dissolved or thoroughly swollen in these monomers is carried out (if necessary after the addition of a polymer (A1Pf)) by thermal or free radical polymerization at from about 50 to 200° C., in particular from 60 to 160° C. The polymerization may be carried out in one or more stages. The polymerization, at least in the first stage and at least up to a conversion of more than 15, preferably of more than 20 to 40% by weight of the monomers, is always to be carried out by thermal or free radical mass polymerization or by solution polymerization. The polymerization can be carried out entirely by mass or solution polymerization (if desired), but can also be continued and completed by another polymerization method after this first stage, the continuation and completion of the polymerization after the first stage preferably being effected by suspension polymerization.

The mass or solution polymerization is preferably carried out with stirring under nitrogen. If, after the first polymerization stage, the polymerization is continued, for example, by suspension polymerization, the conventional additives for this purpose, such as suspension stabilizers, antioxidants, regulators and initiators, such as peroxides, should of course be added to the polymerization batch, in addition to water. Finally, the resulting molding materials (A) are isolated or filtered off and dried.

The novel molding materials (F) contain polymers or polymer blends (P) in the mixture, preferably in an amount of from 40 to 99, in particular from 50 to 97, % by weight, based on the mixture (P)+(A). Very suitable polymers and polymer blends (P) are those having a glass transition temperature of at least +50° C. Very suitable polymers (P) are polymers (P1), prepared from a mixture (P1M) of (P1m1) from 30 to 95, in particular from 50 to 90, and particularly preferably from 60 to 80, parts by weight of at least one alkenylaromatic monomer of the formula

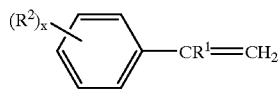

(B1m1)

where $R^1$ is a hydrogen or methyl, $R^2$ is alkyl of 1 to 4, in particular 1 or 2, carbon atoms or chlorine and x is 0, 1 or 2, (P1m2) from 0 to 50, in particular from 15 to 50, particularly preferably from 20 to 40, parts by weight of methacrylonitrile or acrylonitrile, (P1m3) from 0 to 50, particularly from 0 to 40, parts by weight of an ester of methacrylic acid or acrylic acid with a hydroxy compound of 1 to 4 carbon atoms and (P1m4) from 0 to 40, preferably from 0 to 30, parts by weight of a further olefinically unsaturated comonomer of 2 to 20 carbon atoms.

Examples of monomers (P1m1) are p-methylstyrene, p-tert-butylstyrene, 2,4-dimethylstyrene, α-methylstyrene and preferably styrene. A preferred monomer (P1m2) is acrylonitrile. Examples of monomers (P1m3) are tert-butyl acrylate and methacrylate, glycidyl methacrylate, ethyl methacrylate and, preferably, methyl methacrylate. Examples of further monomers (P1m4) are in particular methacrylamide and acrylamide, N-phenylmaleimide and, preferably, maleic anhydride.

Particularly suitable copolymers (P1) are copolymers of a mixture (P1M) of from 60 to 80% by weight of styrene and from 20 to 40% by weight of acrylonitrile.

Particularly suitable polymers (P) are ASA polymers which are prepared by graft copolymerization of monomers forming a hard graft shell, such as styrene and acrylonitrile, onto an elastomeric acrylate polymer as the grafting base. The preparation of ASA polymers and the procedure for carrying out the graft copolymerization onto the elastomeric acrylate polymers, which is generally carried out by emulsion polymerization, is described in many publications in the polymer literature, very suitable elastomeric acrylate polymers being those comprising n-butyl acrylate and/or 2-ethylhexyl acrylate, which contain from 0.5 to 10% by weight, based on the total amount of monomers, of olefinically unsaturated monomers having at least two C=C double bonds as polymerized units.

In general, the graft copolymers also contain certain amounts of copolymers of the monomers used for the hard graft shell, such as styrene/acrylonitrile copolymers, the amount of which depends in particular on the amount of graft monomers which is used in excess for the graft copolymerization. In general, however, they are also mixed with added copolymers of such monomers, such as styrene/acrylonitrile copolymers, as a hard matrix.

For the further description of ASA polymers, reference is made to the relevant patent literature, for example to DE-A 19 11 882, DE-A 28 26 925, DE-A 31 29 378, DE-A 31 29 472, DE-A 31 49 046, DE-A 31 49 358, DE-A 32 06 136 or DE-A 32 27 555.

The polymers (P) may also be mixtures with other compatible or partially compatible polymer types, such as mixtures with polycarbonates, polyphenylene ethers, polymethyl methacrylates or AES polymers. AES polymers are polymers which contain, finely distributed in a hard phase comprising a copolymer of styrene, acrylonitrile and/or methyl methacrylate, a rubber phase which is a graft copolymer having a graft shell of the monomer or monomers forming the hard phase, such as styrene, acrylonitrile and/or methyl methacrylate, and an ethylene/propylene or ethylene/propylene/diene copolymer as the grafting base.

The thermoplastic polymer (P) preferably comprises at least 30, preferably at least 50, % by weight of an ASA polymer and/or copolymer which predominantly contains styrene and acrylonitriles as polymerized units.

The molding material (A), the dulling agent, can be mixed with the polymer or polymers (P) in a suitable mixing unit, such as a screw, a kneader or a roll mill, for example in a ZSK 30 extruder from Werner and Pfleiderer. However, components obtained in aqueous dispersion can also be partially dewatered or mixed with the other component of the mixture (A)+(P) directly as a dispersion, complete drying then being carried out during mixing.

The novel molding material (F) can be processed by the known methods for processing thermoplastics, such as extrusion, injection molding, calendering or compression molding.

Preferably, shaped articles for automotive construction are produced in the novel molding materials (F) by injection molding.

The dull molding materials (F) of the novel mixtures have good impact strength and good flow behaviour. Shaped articles produced from the novel molding materials (F) have the advantage that their surface gloss can be adjusted and dull surfaces can be produced.

The examples and comparative examples which follow illustrate the invention. Parts and percentages are by weight, unless stated otherwise.

The commercial polyvinylpyrrolidone used was obtained from BASF AG and had a K value of 90 (according to Fikentscher, Cellulosechemie 13(1932)58).

The polyvinyl alcohol used (Moviol® 30-92 from Hoechst AG) had a degree of hydrolysis of 92 mol % and its 4% strength aqueous solution had a viscosity of 30 mPas at 20° C.

The gloss was determined using 2 m thick circular discs which were injection molded at a plastics melt temperature of 220° C. and a mold temperature of 30° C., according to DIN 67530, with a Dr. Lang reflectometer UME 1 at an angle of incidence of 45°.

The glass transition temperature was determined by means of the DSC method (K. H. Illers, Makromolekulare Chemie 127 (1969) 1 et seq.).

The viscosities $Z\eta$ in ml/g were measured in 0.5% strength solution in dimethylformamide similarly to DIN 53726.

EXAMPLE 1

(Preparation of an ASA Polymer (P))

A first graft shell comprising 13 parts of styrene and a second graft shell comprising 27 parts of a styrene/acrylonitrile mixture (weight ratio 75:25) were grafted onto 60 parts of copolymer of 98% of n-butyl acrylate and 2% of dihydrodicyclopentadienyl acrylate in emulsion. The resulting graft polymer had a particle size of 0.45 µm.

50 parts of this graft polymer were mixed with 50 parts of a styrene/acrylonitrile copolymer (weight ratio 65:35, viscosity number: 80 ml/g) in an extruder and the mixture was extruded and granulated. The surface gloss of this ASA polymer (P) is shown in Table 1.

EXAMPLE 2

(Preparation of a Molding Material (A))
a) Preparation of the Acrylate Copolymer (A2)
1685 g of toluene were introduced into a flask and heated to 75° C. under nitrogen, and then 5% each of feeds 1 and 2 below were initially taken with stirring.

| Feed 1 | Feed 2 |
| --- | --- |
| 750 g of n-butyl acrylate | 818 mg of azoisobutyronitrile |
| 17.6 g of allyl methacrylate | 40 ml of toluene |
| 60 g of hydroxypropyl methacrylate | 40 ml of acetone |

The remainder of feeds 1 and 2 was then metered in continuously during the next 4 hours. After a total polymerization time of 8 hours at 75° C., the batch was cooled and stabilized with 0.12% (based on the amount of the monomers) of octadecyl 3-(3,5-di-tert-butyl-4-hydroxyphenyl)propionate. The conversion was 95%.

b) Preparation of the Molding Material (A)

The toluene, acetone and any residual of monomer present was removed from the batch a) under reduced pressure in a rotary evaporator and replaced by added monomers to give a mixture (AM) of 1272 g of styrene, 424 g of acrylonitrile and 77 g of maleic anhydride, in which 150 g of the acrylate copolymer (A2) were present in dissolved or swollen form. The mixture was introduced into a steel kettle and heated to 123° C. under nitrogen and with stirring. After a conversion of about 20% of the monomers, 1.49 g of tert-dodecyl mercaptan and 2.31 g of octadecyl 3-(3,5-di-tert-butyl-4-hydroxyphenyl)propionate, as antioxidant, were added and 1.93 g of dicumyl peroxide were introduced after a conversion of 20%. After a total conversion of 33.9% of the monomers, 1900 g of water, 2.0 g of tetrasodium diphosphate, 20 g of polyvinylpyrrolidone and 59.8 g of a 10% strength aqueous solution of polyvinyl alcohol were added. The mixture was then polymerized to completion for 3 hours at 110° C., for a further 3 hours at 130° C. and for a further 6 hours at 140° C. It was then cooled and the polymer was filtered off and dried. The surface gloss of the shaped article produced from the mixture of this dulling agent with the ASA polymer (B) is shown in Table 1.

EXAMPLE 3

(Preparation of a Dull Molding Material (A))
a) Preparation of an Acrylate Copolymer (A2)
1753 g of cyclohexane were introduced into a flask and heated to 75° C. under nitrogen, and 5% each of feeds 1 and 2 below were then initially taken with stirring.

| Feed 1 | Feed 2 |
| --- | --- |
| 750 g of n-butyl acrylate | 818 mg of azoisobutyronitrile |
| 6.51 g of allyl methacrylate | 40 ml of acetone |
| 22.5 g of maleic anhydride | 40 ml of toluene |

The remainder of feeds 1 and 2 was then metered in continuously during 4 hours and, after a total polymerization time of 8 hours, the batch was cooled and stabilized with 0.12% of octadecyl 3-(3,5-di-tert-butyl-4-hydroxyphenyl) propionate as an antioxidant. The monomer conversion was 95%.

b) Preparation of the Molding Material (A)

The cyclohexane, toluene, acetone and residual monomers were removed under reduced pressure in a rotary evaporator and then replaced by monomers to give a mixture of 150 g of the acrylate copolymers (A2) in dissolved or swollen form in a mixture of 1247 g of styrene and 416 g of acrylonitrile.

110 g of a copolymer of 72% of styrene, 24% of acrylonitrile and 4% of maleic anhydride, as reactive polymer (A1Pf), and then 9.3 g of ethylenediamine as a crosslinking agent (AMV) were added to this mixture. The resulting mixture (AM) was introduced into a steel kettle and heated to 123° C. under nitrogen and with stirring. After a conversion of about 20% of the monomers, 1.49 g of tert-dodecyl mercaptan and 2.31 g of octadecyl 3-(3,5-di-tert-butyl-4-hydroxyphenyl)propionate, as an antioxidant, were added, and 1.7 g of dicumyl peroxide were introduced after a conversion of 30%, After a total monomer conversion of 33%, 1900 g of water, 2.0 g of tetrasodium diphosphate, 20 g of polyvinylpyrrolidone and 20 g of 10% strength aqueous solution of polyvinyl alcohol were added. The mixture was polymerized to completion for 3 hours at 110° C., for a further 3 hours at 130° C. and for a further 6 hours at 140° C.

The surface gloss of shaped article produced from a mixture of this dulling agent (A) with an ASA polymer (P) is shown in Table 1.

EXAMPLE 4

(Preparation of a Molding Material (A))

a) Preparation of an Acrylate Copolymer (A2)

6528 g of cyclohexane were introduced into a flask and heated to 75° C. under nitrogen and with stirring, and 5% each of feeds 1 and 2 below were then initially taken with stirring.

Feed 1

3200 g of n-butyl acrylate 26.12 g of allyl methacrylate 56.32 g of tert-butyl peroxycrotonate 32.00 g of tert-butyl 3-isopropenylcumyl peroxide Feed 2

3487 mg of azobisisobutyronitrile 160 ml of acetone 160 ml of toluene

The remainder of feeds 1 and 2 was then metered in continuously during the following 4 hours and, after a total polymerization time of 8 hours, the batch was cooled and was stabilized with 0.12% of octadecyl 3-(3,5-di-tert-butyl-4-hydroxyphenyl) propionate as an antioxidant. The conversion was 94% of the monomer.

b) Preparation of the molding material (A)

The cyclohexane, acetone, toluene and residual monomers were removed under reduced pressure in a rotary evaporator and then replaced by other monomers and additives to give a mixture of 45 g of 2,5-bis(tert-butylperoxy)-2,5-dimethylhexane, and 1170 g of the acrylate copolymer (A2), dissolved in 10380 g of styrene and 3450 g of acrylonitrile. The mixture was introduced into a steel kettle and was heated to 87° C. under nitrogen and with stirring. After a conversion of about 20% of the monomers, 22.5 g of tert-dodecyl mercaptan and 18 g of octadecyl 3-(3,5-di-tert-butyl-4-hydroxyphenyl)propionate, as an antioxidant, were added. At a monomer conversion of 33%, 15.4 liters of water, 150 g of polyvinylpyrrolidone, 15 g of tetrasodium diphosphate and 450 g of 10% strength polyvinyl alcohol solution were added. The mixture was polymerized to completion for 3 hours at 110° C., for a further 3 hours at 130° C. and for a further 6 hours at 140° C. It was then cooled and the resulting polymer was filtered off and dried.

The surface gloss of a shaped article produced from a mixture of the material (A), as the dulling agent, with an ASA polymer (P) is shown in Table 1.

EXAMPLE 5

(Preparation of Molding Material (F) and Shaped Articles)

Mixtures of 70 parts of the ASA polymer (P) from Example 1 with, in each case, 30 parts of the molding materials (A) of Examples 2 to 4, as the dulling agent, were extruded in a ZSK 30 extruder from Werner and Pfleiderer at 250° C. and with a throughput of 10 kg/hour.

Circular discs were produced from the ASA polymer (P) of Example 1 and the prepared polymer blends (AB) by injection molding at 220° C. and at a mold temperature of 30° C., and their surface gloss was determined as stated above. The results are shown in Table 1.

TABLE 1

Surface gloss of shaped articles produced from ASA polymer (P) and mixtures thereof with materials (A)

|  | 1 (Comparison) | 2 | 3 | 4 |
|---|---|---|---|---|
| Parts of ASA polymer P of Example 1 | 100 | 70 | 70 | 70 |
| Parts of molding material (A) of: | | | | |
| Example 2 | 0 | 30 | 0 | 0 |
| Example 3 | 0 | 0 | 30 | 0 |
| Example 4 | 0 | 0 | 0 | 30 |
| Surface gloss (%) | 85 | 20 | 8 | 19 |

EXAMPLE 6

(Preparation of a Dull Molding Material (A))

a) Preparation of an Acrylate Polymer (A2)

1868 g of toluene were introduced into a flask and heated to 75° C. under nitrogen and with stirring, and 41 g of a monomer mixture comprising 89.7% of n-butyl acrylate, 2.3% of allyl methacrylate and 8% of glycidyl methacrylate, and 41 mg of azobisisobutyronitrile, were then added. 787 g of a monomer mixture of the same composition and 777 mg of azobisisobutyronitrile were then metered in during the following 4 hours. After a polymerization time of a further 4 hours, the polymerization batch was cooled and was stabilized with 19 g of octadecyl 3-(3,5-di-tert-butyl-4-hydroxyphenyl)propionate. The conversion was 92%.

b) Preparation of the molding material (A)

The toluene and any acrylate monomer present from stage a) were removed under reduced pressure in a rotary evaporator, and amounts of styrene and acrylonitrile and a copolymer of 73.5% of styrene, 24.5% of acrylonitrile and 2% of maleic anhydride (polymer A1Pf) were then added so that a mixture of 7.8% of acrylate polymer (A2), 7.8% of copolymer (A1Pf) and 84.4% of a monomer mixture (A1m) of styrene and acrylonitrile (weight ratio 75:25) resulted. The acrylate copolymer was present in dissolved form in the mixture. 1923 g of the solution were introduced into a 5 liter steel kettle and heated to 123° C. with stirring. At a conversion of 20% of the monomers, 1.49 g of tert-butyl mercaptan and 2.31 g of octadecyl 3-(3,5-di-tert-butyl-4-hydroxyphenyl)propionate, as an antioxidant, were added. At a monomer conversion of 33%, 1.9 g of dicumyl peroxide, 1900 g of water, 20 g of polyvinylpyrrolidone, 1.0 g of tetrasodium diphosphate and 59.8 g of a 10% strength aqueous polyvinyl alcohol solution were added. The polymerization batch was polymerized to completion for 3 hours at 110° C., for 3 hours at 130° C. and for 6 hours at 140° C. It was then cooled and the polymer was filtered off and dried. The novel molding material (A) was dull and had an impact strength of 37 kJ/m$^2$ at 23° C., a notched impact strength of 2.6 kJ/m$^2$ at 23° C. and a melt volume index of 7.4 ml/10 min.

The impact strength was determined according to DIN 53 453-K, 5/75 edition and the notched impact strength was determined according to DIN 53 4534-K, 5/75 edition, this being done using small standard bars which were injection molded at a melt temperature of 240° C. (mold temperature 60° C.).

The melt volume index was determined according to DIN 53 735 at 200° C. and under a load of 21.6 kg.

We claim:

1. A molding material (F) for the production of shaped articles having reduced surface gloss, and based on polymers or polymer blends (P), which contain, in admixed form and in sufficient amount, a molding composition (A) based on a graft copolymer as a dulling agent, wherein the molding material (A) was prepared by one-stage or multistage polymerization of a mixture (AM) containing a) one or more olefinically unsaturated monomers (A1m) which form the graft shell (A1) and form a polymer or copolymer having a glass transition temperature of at least +20° C., and b) as the grafting base, a prepared acrylate polymer (A2) which is dissolved or swollen in the monomer or monomers (A1m) and has a glass transition temperature of less than −20° C., at least the first stage of the polymerization of the mixture (AM) being performed, to a conversion of more than 15% by weight of the monomers, by thermal or free radical mass or solution polymerization.

2. A molding material (F) as defined in claim 1, wherein, for the preparation of the molding material (A), the polymerization of the mixture (AM) was carried out, to a conversion of more than 20% by weight of the monomers, by thermal or free radical mass or solution polymerization.

3. A molding material (F) as defined in claim 1, wherein the acrylate polymer (A2) used for the preparation of the molding material (A) contains, in addition to at least one monomer (A2m1) of the formula $CH_2=CR^1-COOR^2$, where $R^1$ is hydrogen or methyl and $R^2$ is alkyl of 1 to 12 carbon atoms, a monomer (A2m2) having two nonconjugated olefinically unsaturated C=C double bonds in an amount of from 0.3 to 12% by weight, based on the acrylate polymer (A2) as polymerized units.

4. A molding material (F) as defined in claim 1, wherein the acrylate polymer (A2) used for the preparation of the molding material (A) contains, as polymerized units, an olefinically unsaturated monomer (A2m3) having a chemically reactive group (A2m3x) in an amount of from 1 to 25% by weight, based on the acrylate polymer, and from 1 to 25% by weight, based on the total amount of monomers in the mixture (AM), of a monomer (A1mf) or a polymer (A1Pf) are added to the monomers (A1m) in the mixture (AM), each monomer (A1mf) or each polymer (A1Pf) containing a chemically reactive group which is capable of reacting with the chemically reactive groups (A2m3x) of the acrylate polymer (A2) or which, with the aid of a chemically reactive crosslinking agent (AMV) added to the mixture (AM), permits coupling with the chemically reactive groups (A2m3x) of the acrylate polymer.

5. A molding material (F) as defined in claim 1, wherein the acrylate polymer (A2) used for the preparation of the molding material (A) contains, as polymerized units, at least one olefinically unsaturated monomer (A2m4) which forms free radicals on thermal decomposition and can initiate the polymerization of olefinically unsaturated monomers.

6. A molding material (F) as defined in claim 1, wherein the monomers (A1m) used for the preparation of the molding material (A) in the mixture (AM) form polymers or copolymers which are completely or partially compatible with the polymers or polymer blends (P).

7. A molding material (F) as defined in claim 1, wherein the monomers (A1m) used for the preparation of the molding material (A) in the mixture (AM) predominantly comprise alkenyl aromatics, nitriles of acrylic acid or methacrylic acid or lower alkyl methacrylates.

8. A molding material (F) as defined in claim 1, wherein the polymers or polymer blends (P) are or contain ASA polymers or mixtures thereof.

9. A molding material (F) as defined in claim 1, wherein the polymers or polymer blends (P) are or contain copolymers which contain, as polymerized units, relatively large amounts of alkenyl aromatics, nitriles of acrylic acid or methacrylic acid or lower alkyl methacrylates.

* * * * *